(12) United States Patent
Oi et al.

(10) Patent No.: US 6,206,330 B1
(45) Date of Patent: Mar. 27, 2001

(54) PIPE CLAMP

(75) Inventors: Shigeo Oi; Ryosuke Matsunaga, both of Aichi (JP)

(73) Assignee: Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 09/180,941
(22) PCT Filed: Mar. 18, 1998
(86) PCT No.: PCT/IB98/00382
§ 371 Date: Nov. 17, 1998
§ 102(e) Date: Nov. 17, 1998
(87) PCT Pub. No.: WO98/41768
PCT Pub. Date: Sep. 24, 1998

(30) Foreign Application Priority Data

Mar. 18, 1997 (JP) .................................................. 9-064462

(51) Int. Cl.$^7$ ............................................................ F16L 3/22
(52) U.S. Cl. ............................ 248/68.1; 248/635; 248/909
(58) Field of Search ............................. 248/68.1, 73, 55, 248/74.2, 634, 635, 909

(56) References Cited

U.S. PATENT DOCUMENTS

| | | | | |
|---|---|---|---|---|
| 3,387,343 | * | 6/1968 | Fitz-Gerald | 403/188 |
| 4,262,869 | * | 4/1981 | Menshen | 248/74.4 |
| 4,899,964 | * | 2/1990 | Sick | 248/68.1 |
| 5,002,243 | * | 3/1991 | Kraus et al. | 248/68.1 |
| 5,170,984 | * | 12/1992 | Ruckwardt | 248/635 |
| 5,271,587 | * | 12/1993 | Schaty et al. | 248/68.1 |
| 5,271,588 | * | 12/1993 | Doyle | 248/68.1 |
| 5,301,907 | * | 4/1994 | Julian | 248/74.1 |
| 5,316,245 | * | 5/1994 | Ruckwardt | 248/68.1 |
| 5,460,342 | * | 10/1995 | Dore et al. | 248/74.2 |

FOREIGN PATENT DOCUMENTS 5-14771  2/1993  (JP) .
5-96673  12/1993 (JP) .

* cited by examiner

Primary Examiner—Anita M. King
(74) Attorney, Agent, or Firm—Wenderoth, Lind & Ponack, L.L.P.

(57) ABSTRACT

A holding member (1) for holding a pipe (P), and a mounting member (2) for fixing the pipe (P) to a body panel (B) are previously connected together by a thin connecting portion (9). The holding member (1) and the mounting member (2) in the integrated state are set in a forming die. The connecting portion (9) is collapsed with the closing of such the die that the holding member (1) and the mounting member (2) are separated from each other. A coupling member (3) is formed in this state. Accordingly, the working efficiency can be improved as compared with the case where the holding member and the mounting member are individually set in the die. The holding member (1) and the mounting member (2) are coupled together by the coupling member (3). Since the coupling member (3) is formed of a rubber material, vibration caused in the pipe (P) can be prevented from being transferred to the body panel.

20 Claims, 18 Drawing Sheets

PIPE CLAMP

BACKGROUND OF THE INVENTION

1. Field of the Invention

This invention relates to pipe clamps for holding various types of pipes.

2. Description of the Prior Art

Various types of pipes are used in automobiles and resin holders called pipe clamps are conventionally used to fix the pipes to the automobile body side. The pipe clamps are usually formed integrally of a resin such as polypropylene. Pulsation of a fluid flowing through the pipe sometimes vibrates the pipe clamp. The vibration needs to be prevented from being transferred via the pipe clamp to the automobile body side. In use of the pipe clamp formed integrally of the resin as described above, however, the transfer of vibration is difficult to be prevent.

The prior art has developed a pipe clamp in which a soft resin portion with the ability to absorb vibration is stacked on a pipe holding portion thereof so that the pipe overlaps the soft resin portion. However, since the pipe is held by the soft resin, a holding force against the pipe is inevitably reduced although the soft resin is effective for the absorption of vibration. Consequently, the pipe deviates from its normal state to be held in an inclined state when the pipe clamp is subjected to an external force after having been attached to the pipe.

As a countermeasure, it is proposed to individually form a portion holding the pipe and a portion fixing the pipe to the body side, and to connect these portions by a soft resin portion. As a result, the vibration transferred to the body side could be absorbed by the soft resin portion and a sufficient strength could be ensured in the portion holding the pipe or fixed to the body side.

However, when the pipe clamp comprises two separate members, that is, the pipe holding portion and the pipe fixing portion as described above, connecting the two portions by the soft resin portion is important. An insert molding could be one of most effective measures. The pipe holding portion and the pipe fixing portion need to be integrated previously when these portions are set in a die. The integrating work is troublesome. Moreover, both portions need to be integrated through a space provided for forming the soft resin portion. In this case, setting the two portions in the die with the portions being positioned causes troubles, resulting in an increase in the working time. Thus, the above-described problem is very important in achievement of automated forming of the pipe clamp.

SUMMARY OF THE INVENTION

The present invention has been made in view of the foregoing, and an object thereof is to provide a pipe clamp which can readily be manufactured.

As the means for achieving the above-described object, the present invention provides a pipe clamp comprising a holding member formed of a hard resin for holding a pipe or the like, a mounting member formed of the same hard resin as; of the holding member for mounting the pipe or the like on a fixed surface, and a coupling member formed of a soft resin with an ability to absorb vibration in a space defined between the holding member and the mounting member, thereby coupling both members together, wherein the holding member and the mounting member are previously connected by a connecting portion separable in the forming of the coupling member.

In the present invention, the holding member and the mounting member are integrated by the connecting portion before the forming of the coupling member. The holding member and the mounting member are set in a forming die in the integrated state, so that the coupling member is formed. Since the connecting portion is separated in the forming, the holding member and the mounting member are separated from each other to be in a non-contact states with each other after the forming. Consequently, the vibration from the holding member is absorbed by the coupling member and prevented from transfer to the mounting member.

In a preferred form, the connecting portion is formed so as to be collapsible by a die-closing operation in the forming of the coupling member.

The separation of the connecting portion is effected by the holding member or the mounting member pushed with the die closing operation in the forming of the coupling member. As a result, since no special work for the separation is required, the working efficiency can be improved.

In another preferred form, the holding member includes a portion formed with a pipe holding groove for holding the pipe and the other portion, both portions being separably connected together and being coupled together by the coupling member formed in the space therebetween. Since the holding member is separated, the vibration absorption can further be improved.

In a further preferred form, either the holding member or the mounting member is formed with a void through which a material for the coupling member is caused to flow. Since the material for the coupling member is caused to flow through the void, the coupling strength can be increased by the sticking of the coupling member material.

In still another preferred form, the holding member includes a frame-shaped receiving portion, and the mounting member is formed to be loosely insertable into the receiving portion of the holding member and connected to the holding member by the collapsible connecting portion so as to protrude in a die-closing direction before the forming of the coupling member, the mounting member being pushed by a forming die with the die closing to thereby be moved into the receiving portion, breaking the connecting portion.

Since the mounting member protrudes through the connecting portion in the die-closing direction relative to the receiving portion, a pushing force is readily applied to the mounting member during the die closing. Consequently, the connecting portion can easily be collapsed.

In yet another preferred form, the holding member includes a frame-shaped receiving portion, and the mounting member is accommodated in the receiving portion so as to be connected to the holding member by the collapsible (or breakable) connecting portion, the connecting portion being collapsed directly by a forming die during the die closing such that the mounting member is held at a predetermined position in the receiving portion.

The connecting member is collapsed (or broken) by the forming die during the die closing. At that time, the mounting member is held at the predetermined position in the receiving portion. Consequently, the coupling member can desirably be formed with the mounting member and the holding member being maintained in an initial positional relation.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 4 is a sectional view of the pipe clamp, showing the mounting member having been pushed in;

DETAILED DESCRIPTION OF THE PREFERRED EMBODIMENTS

A first embodiment of the present invention will be described with reference to FIGS. 1 to 7. In the first embodiment, the pipe clamp PC is used to fix automobile piping such as a brake fluid piping to a body panel B. The piping will hereinafter be referred to as "pipe P."

Figure 1:
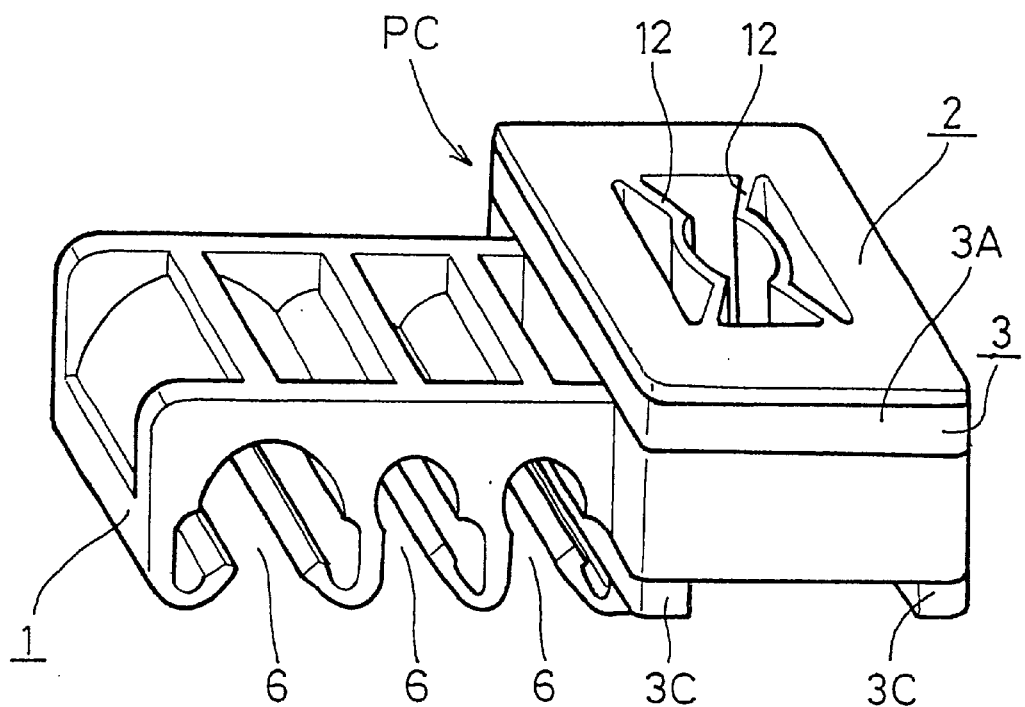
FIG. 1 is a perspective view of the pipe clamp of a first embodiment in accordance with the present invention.
Figure 2:
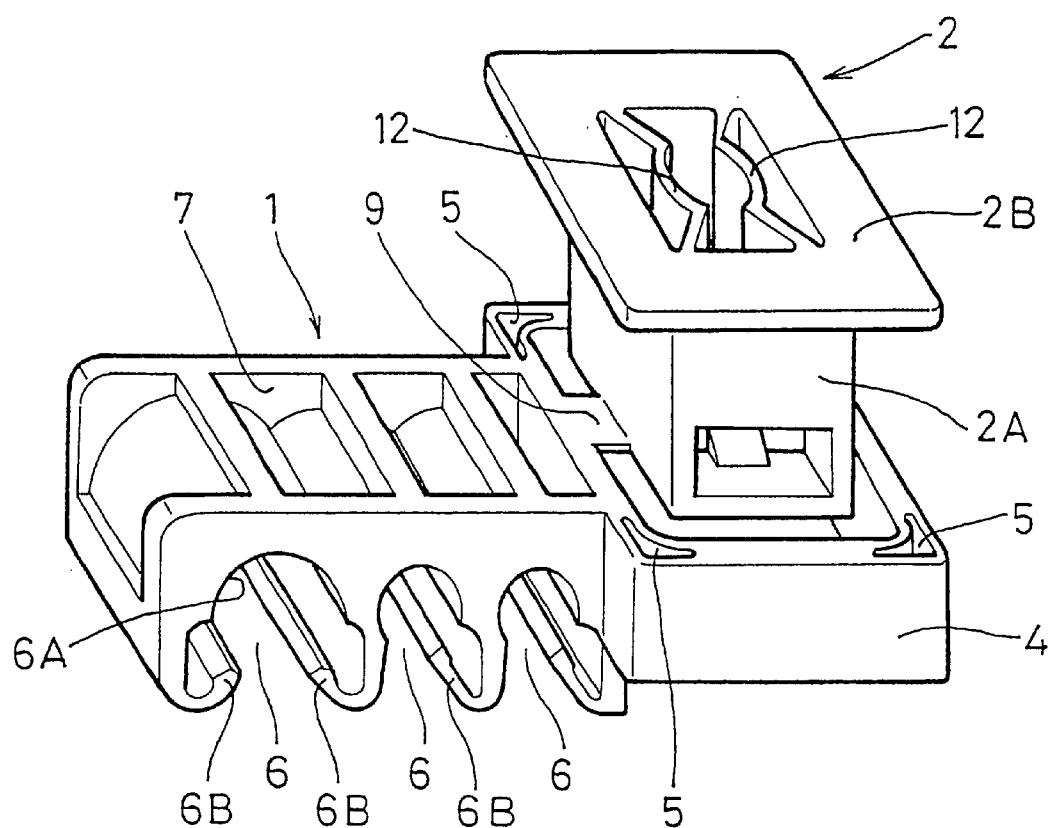
FIG. 2 is a perspective view of the pipe clamp before the forming of the coupling member.
Figure 3:
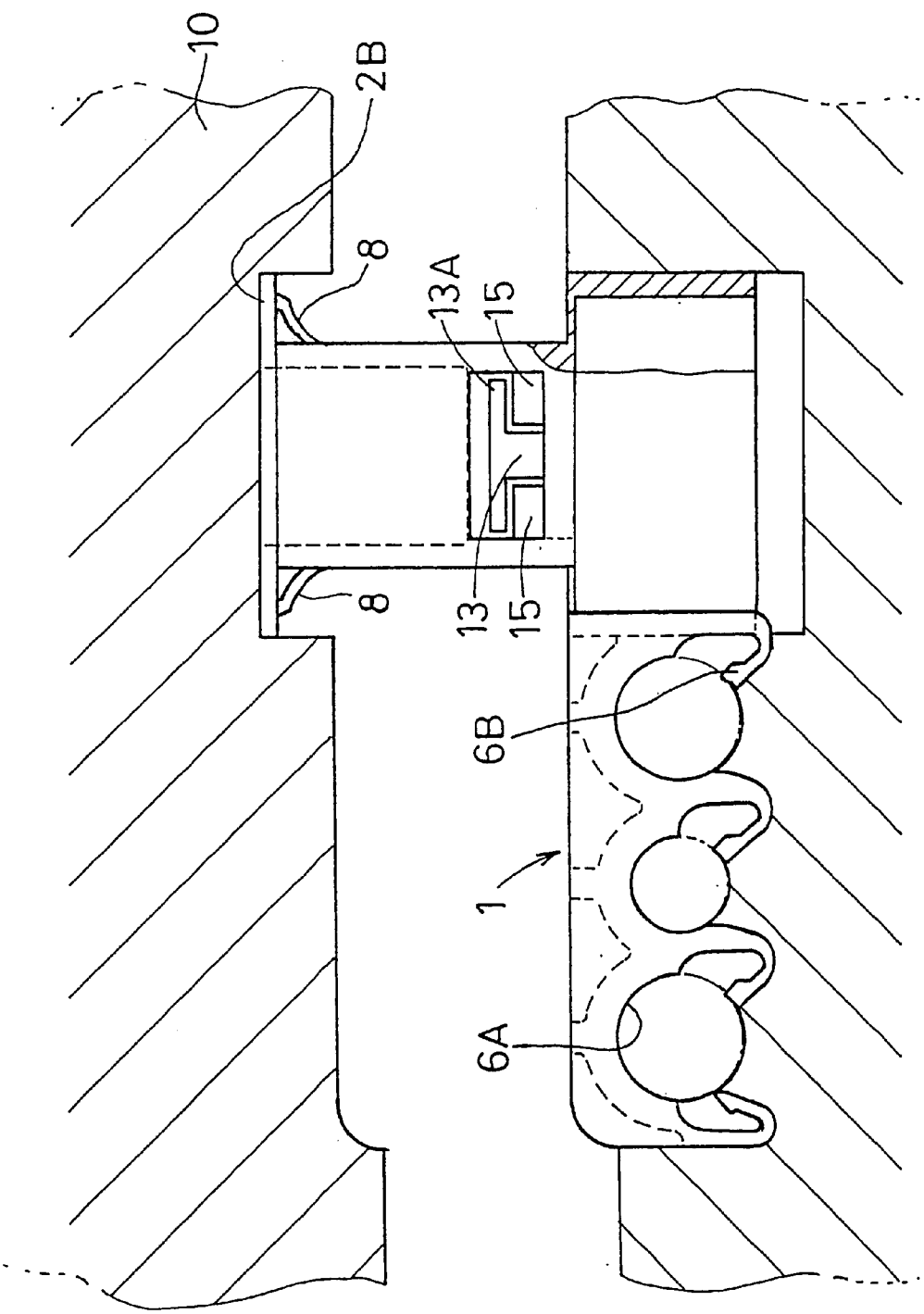
FIG. 3 is a partially broken front view of the pipe clamp.

The pipe clamp PC of the first embodiment comprises a holding member 1 for holding a plurality of pipes P, a mounting member 2 provided for fixing the pipes P to the automobile body side, and a coupling member 3 for coupling the holding and mounting members together by insert molding to serve to absorb of vibration. The holding member 1 and the mounting member 2 are integrated before the forming of the coupling member 3 as shown in FIG. 2. The holding member 1 and the mounting member 2 are each formed of a hard synthetic resin such as polyacetal. The coupling member 3 is formed of a soft resin with elasticity, for example, an elastomer of the styrene-butylene system.

The holding member 1 will first be described. The holding member 1 is provided at one side thereof (the right-hand side in FIG. 2) with a generally square frame-shaped receiving portion 4 having upper and lower openings. The receiving portion 4 is adapted to accommodate a base 2A of the mounting member 2 with a space therebetween over the entire periphery of the base. Through holes 5 each serving as a void in the invention are formed in four corners of the upper end of the receiving portion 4 respectively. A material for the coupling member 3 is caused to flow through the holes 5 so that a mechanical strength of each of the coupling member 3 and the holding member 1 is ensured. Three pipe-holding grooves 6 extend in parallel to one another in the opposite side of the holding member 1. Two of the grooves 6 are used to hold small-diameter pipes P respectively, whereas the other groove 6 is used to hold a large-diameter pipe P.

Each pipe holding groove 6 is formed generally into a downwardly open U-shape as viewed in FIG. 2 and has in its deep inside an accommodating section 6A conforming to an outer circumference of the corresponding pipe P. An opening edge at one side of each groove 6 holding the small-diameter pipe P protrudes inwardly to thereby serve as a fall-off preventing claw 6B. The groove 6 holding the large-diameter pipe P is formed with fall-off preventing claws 6B on opening edges at both sides thereof respectively. Each claw 6B is allowed to flex in a spreading direction. Each claw 6B returns to its former shape after the pipe P has been introduced into the groove 6, abutting and engaging the outer circumference of the pipe P to thereby prevent the pipe from falling off. The holding member 1 has reduced thickness portions 7 in the outer wall thereof for the purpose of reduction in the material therefor.

The mounting member 2 will now be described. The mounting member 2 includes a plate 2B having a size and shape conforming to those of the upper face of the receiving portion 4. The plate 2B has a square cylindrical base 2A formed on the backside thereof. The base 2A is loosely insertable into the receiving portion 4 as described above. A pair of bridging pieces 8 are formed between the backside of the plate 2B and the base 2A. A space is defined by the backside of the plate 2B, the base 2A and each bridging piece 8. The material for the coupling member 3 is caused to flow through each space during the forming of the coupling member 3 so that the mechanical strength of each of the coupling member 3 and the holding member 1 is ensured.

The holding member 1 and the mounting member 2 are connected by thin connecting portions 9 before the forming of the coupling member 3 to be integrated together. More specifically, the thin connecting portions 9 connect between the central upper opening edges of the receiving portion 4 and the central lower edges of the base 2A of the mounting member 2 respectively, so that the overall mounting member 2 protrudes from the receiving portion 4 of the holding member or is connected to the holding member so as to be put on the latter. The protruding direction of the mounting member 2 corresponds to a closing direction of a moving die 10 when the coupling member 3 is set in a forming die (fixed die). Each connecting portion 9 has such strength as to be readily collapsed (or broken) when the moving die 10 is closed to thereby push the plate 2B of the mounting member 2. Furthermore, when the mounting member 2 is pushed by the moving die 10, the base 2A extends through the receiving portion 4 to be located outside the level of the opening edge of the grooves 6. At the same time, a predetermined space is defined between the plate 2B side and the opening edge of the receiving portion 4 (see FIG. 4).

Figure 5:
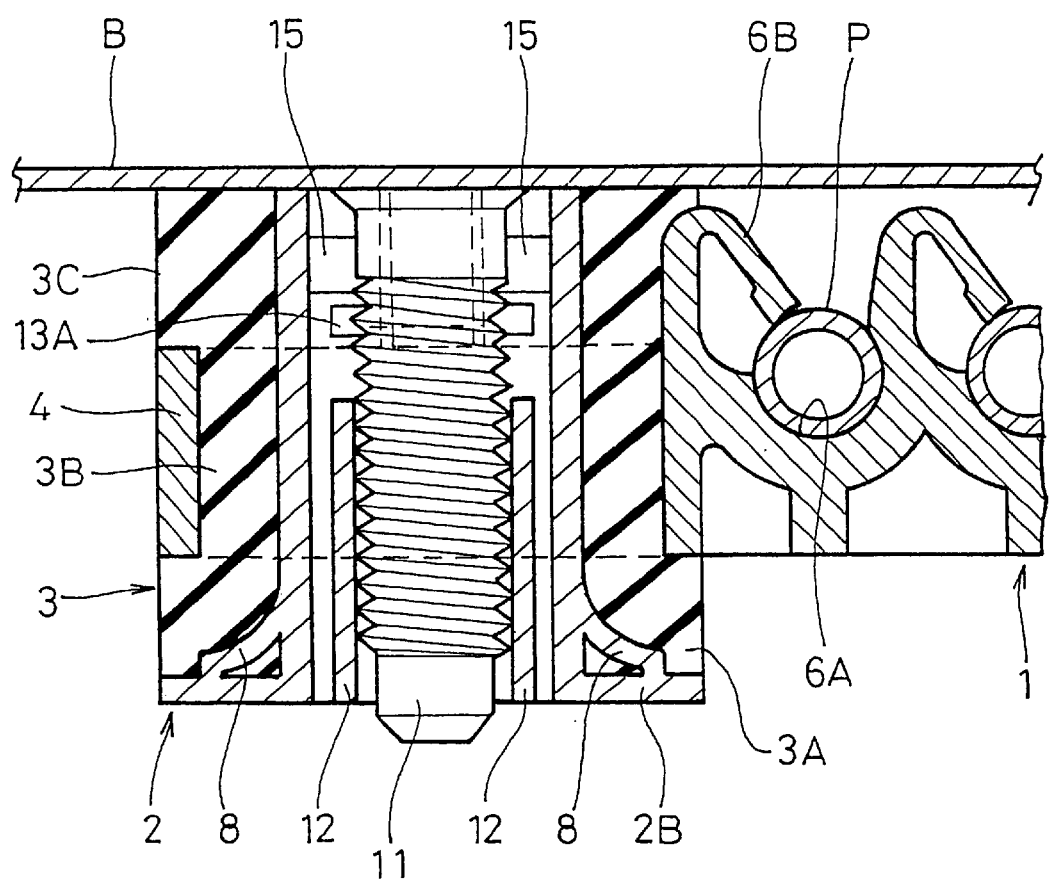
FIG. 5 is a sectional view of the pipe clamp taken approximately in the middle of its height near the receiving portion.
Figure 6:
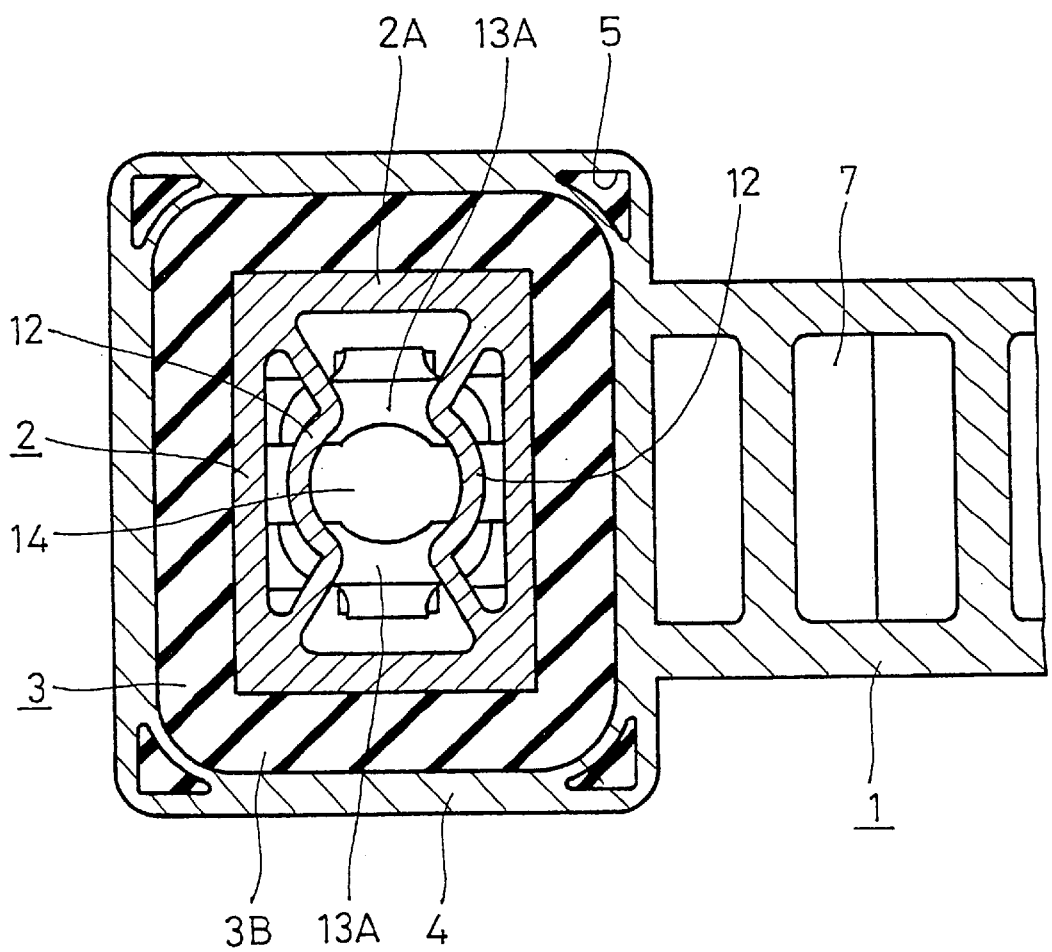
FIG. 6 is a sectional bottom view of the pipe clamp.
Figure 7:
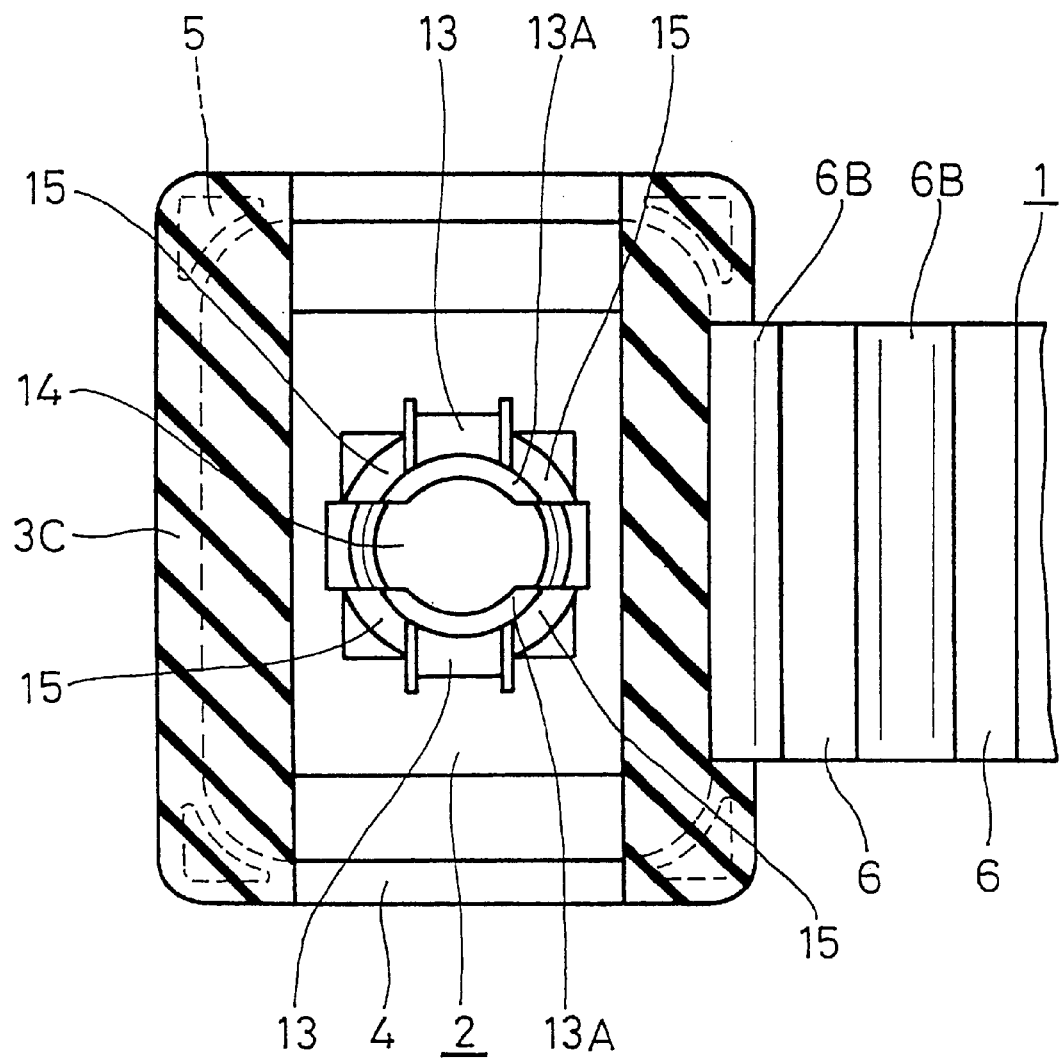
FIG. 7 is a sectional view of the pipe clamp.

The plate 2B has a central opening communicating with the interior of the base 2A. The base 2A has in its inside a pair of bolt supports 12 for supporting a stud bolt 11 standing from the body panel B. Each bolt support 12 has a substantially semicircular horizontal section and extends from the opening edge of the plate 2B to have a predetermined depth, thereby holding the distal end side of the stud bolt 11 over a predetermined length of the latter as shown in FIG. 5. Furthermore, each bolt support 12 extends diagonally from the locations near the corners of opposite wall faces inside the base 2A and has a central arcuate portion connecting between the diagonally extending portions. The arcuate portions of the bolt supports 12 are opposed to each other so as to surround the stud bolt 11. Furthermore, the arcuate portions of the bolt supports 12 are flexible in a spreading direction, thereby stably holding the stud bolt 11.

A pair of engaging claws 13 engageable with the stud bolt 11 are provided on the opposite end of the base 2A (the end at the side opposite the body panel B). More specifically, the backside of the base 2A is open to thereby serve as an insertion hole 14 through which the stud bolt 11 is inserted. The engaging claws 13 are disposed to be opposed to each other in the direction crossing the direction in which the bolt supports 12 are opposed to each other at the opening edge of the insertion hole 14. In more detail, each of the engaging claws 13 protrudes obliquely inward from the opening edge of the insertion hole 14 and is allowed to flex by a suitable amount. Each engaging claw 13 has an overhang 13A extending circumferentially from both sides of the distal end thereof.

In the embodiment, each overhang 13A is formed in an angular range slightly smaller than a half of the circumference of the stud bolt 11. Both overhangs 13A are capable of engaging the stud bolt 11. Four guide pieces 15 are disposed between the engaging claws 13 so as to be circumferentially spaced from the latter. Each guide piece 15 has an outwardly spreading tapered face formed on an inside of a root portion thereof, so that the stud bolt 11 can readily be guided. Each guide piece 15 is so long that the distal end thereof is located below the corresponding overhang 13A.

Figure 4:
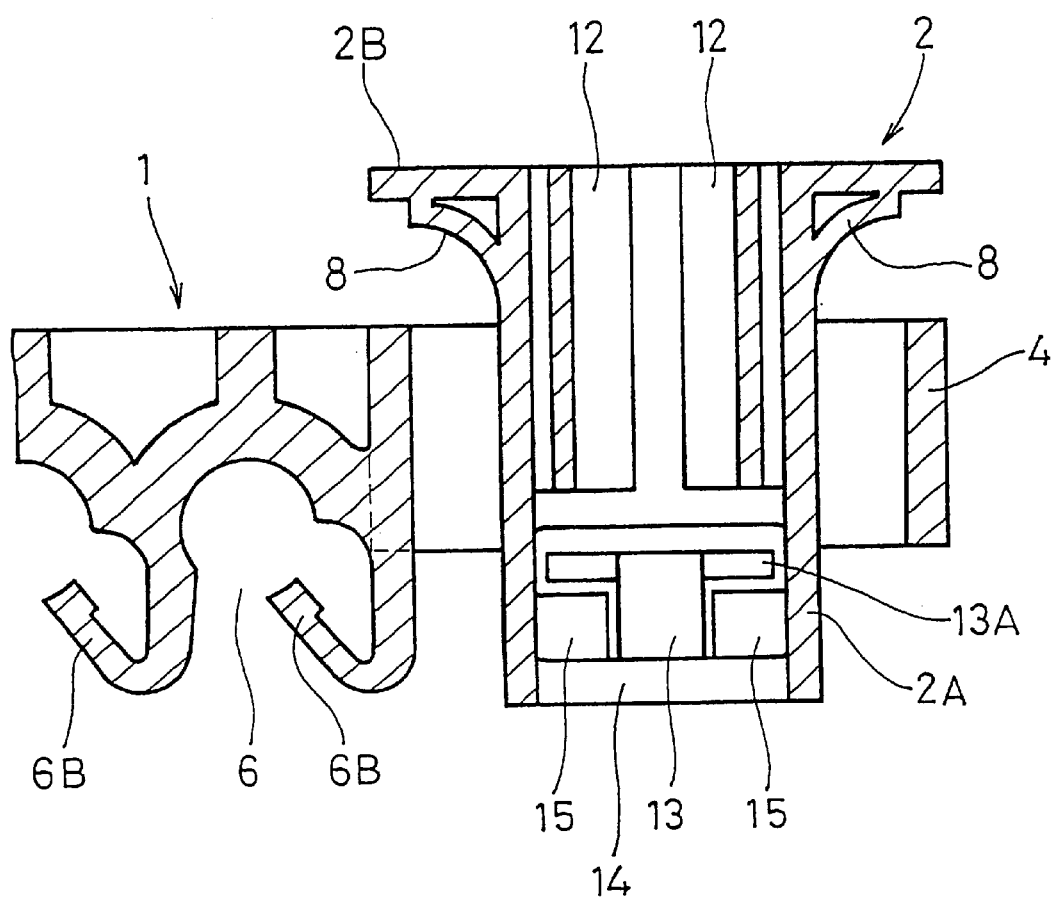

The forming of the coupling member 3 will now be described The holding member 1 and the mounting member 2 are set in the forming die (not shown) in the integrated state as described above. These members are set in the die so that the base 2A of the mounting member 2 is opposed to the moving die 10. When moved for the die closing, the moving die 10 pushes the base 2A such that the connecting portion 9 is subjected to a pushing force to thereby be collapsed (or broken). As a result, the holding member 1 and the mounting member 2 are separated from each other. The base 2A of the mounting member 2 is then inserted deep into the receiving portion 4 such that a space is defined between the base 2A and the inner wall of the receiving portion 4 over the entire circumference thereof as shown in FIG. 4.

The die is closed as described above and only a space used for forming the coupling member 3 is defined in the die. The molten soft resin is supplied into the die and the forming is completed. The desired pipe clamp PC is obtained after opening the die. The formed coupling member 3 includes a flange 3A held between the backside of the plate 2B and the upper edge of the receiving portion 4, a square cylindrical portion 3B extending downward from the flange 3A tightly inserted between the receiving portion 4 and the base 2A, and a pair of legs 3C projecting lower than the receiving portion to be substantially planar with the backside of the base 2A. Furthermore, the molten soft resin is also introduced through the holes 5 and the bridge pieces 8 during the forming of the coupling member 3. Consequently, the mechanical coupling strength of the coupling member 3 is ensured relative to both of the holding member 1 and the mounting member 2.

The pipes P are held by the above-described pipe clamp PC as follows. First, the groove 6 corresponding to the diameter of the pipe P to be fixed is selected. The pipe P is pushed into the selected groove 6. The pipe P is introduced into the groove 6, pushing the fall-off preventing claws 6B in the spreading direction. Each claw 6B elastically returns to its former shape when the pipe P is accommodated in the accommodating section 6A so as to be fitted with its inner wall surface. Since the distal end of each claw 6B abuts against the outer circumferential surface of the pipe P, the pipe is prevented from falling off and is held in the accommodating section 6A in this state.

The pipe clamp PC is mounted on the body panel B after the pipe P has been held by the pipe clamp. The distal end of the stud bolt 11 is aligned with the insertion hole 14 and thrust thereinto. The stud bolt 11 is inserted into the hole 14, spreading the engaging claws 13. When the stud bolt 11 is inserted to its root portion or to its normal depth, the overhangs 13A of the engaging claws 13 engage the shank of the stud bolt 11 to thereby prevent falling off of the latter. Thus, the pipe clamp PC and accordingly the pipe P are fixed to the body panel B. Since the end of the stud bolt 11 is held by the bolt supports 12 in a predetermined range of the length thereof, the stud bolt 11 can be held in its normal upright state without inclination.

The holding member 1 and the mounting member 2 are completely separated from each other in the forming of the coupling member. Even if the pipe P should cause vibration, the coupling member 3 would absorb the vibration. Thus, since the transfer of vibration to the mounting member 2 is reliably prevented, offensive vibration can be prevented from transferring through the body panel B. Furthermore, the portion of the pipe clamp PC holding the pipe P or fixed to the body panel B is formed of the hard resin. That is, the portion of the pipe clamp PC requiring rigidity can be formed of the hard resin. Consequently, the pipe P can reliably be held by the pipe clamp PC and can reliably be fixed to the body panel B.

In the above-described embodiment, the holding member 1 and the mounting member 2 are integrated by the connecting portion 9 in the forming of the coupling member 3. These members can readily be set in the die. Furthermore, a reduction in the number of parts reduces the controlling and manufacturing costs of the pipe clamp PC. Additionally, since the connecting portion 9 is collapsed by the die closing, an extra work for the collapse is not required and accordingly, the working efficiency can be improved.

Figure 8:
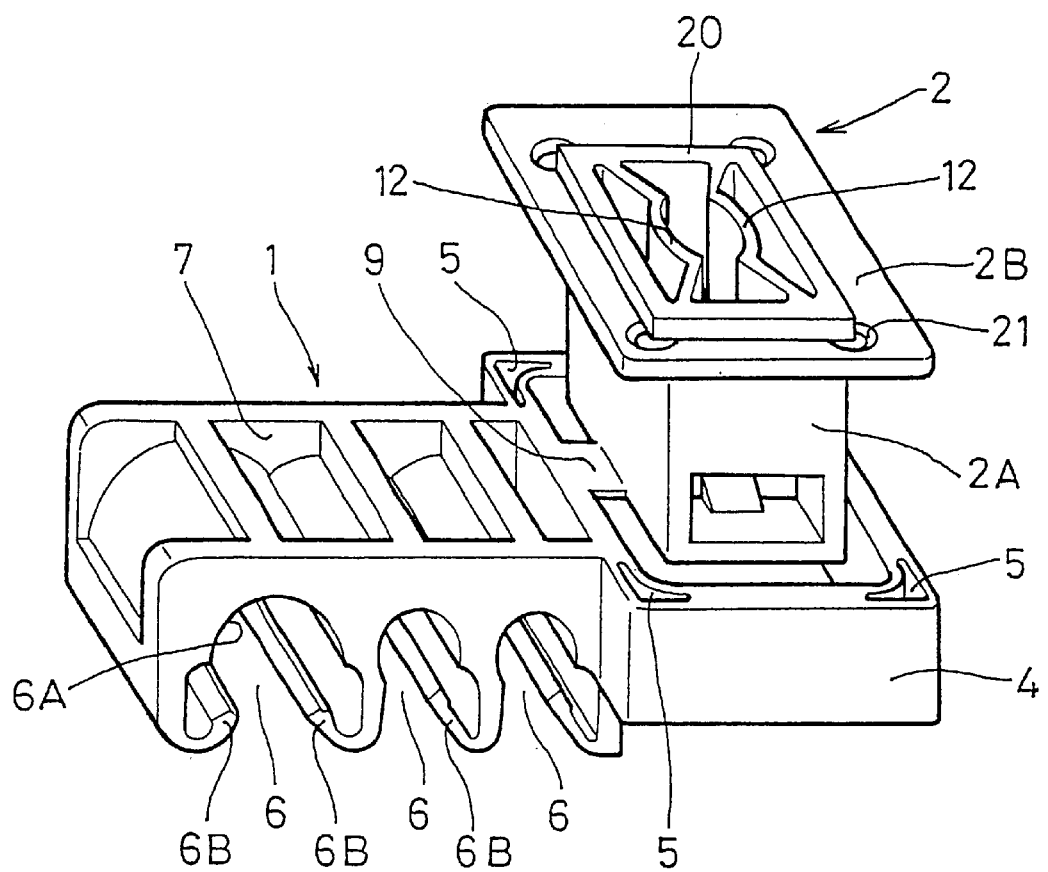
FIG. 8 is a perspective view of the pipe clamp of a second embodiment before the forming of the coupling member.
Figure 9:
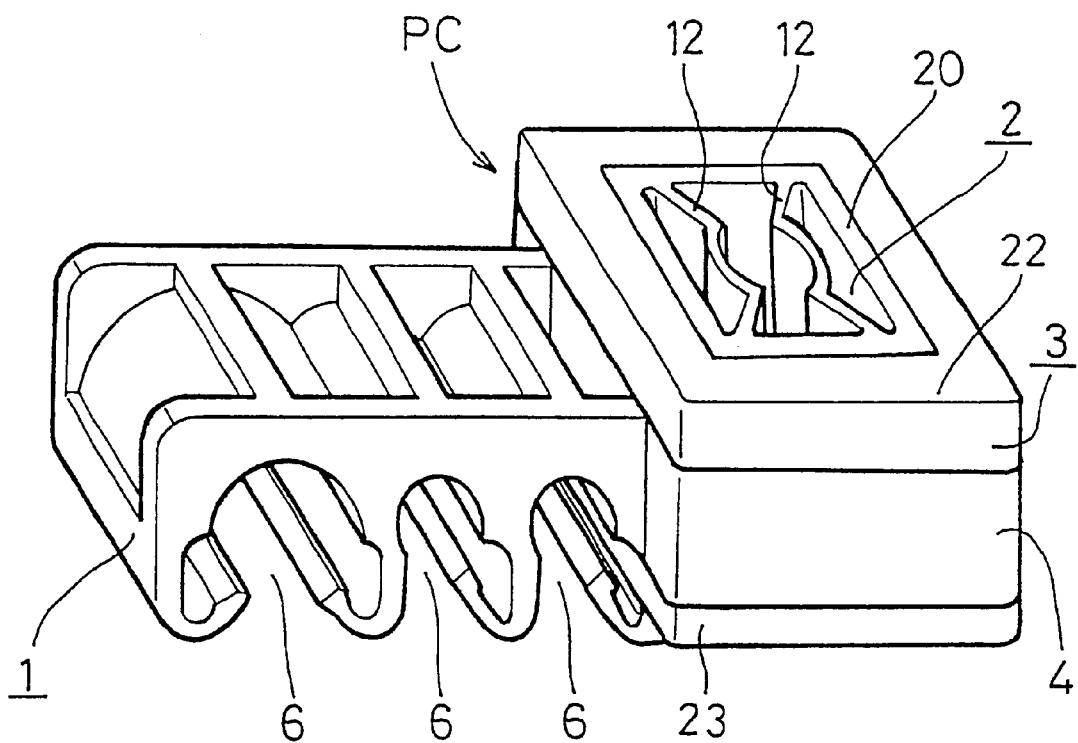
FIG. 9 is a perspective view of the pipe clamp after the forming of the coupling member.

FIGS. 8 and 9 illustrate a second embodiment of the invention. In the second embodiment, the location of the coupling member 3 is changed so that the connecting strength of the mounting member 2 relative to the holding member 1 is improved. More specifically, the plate 2B includes a central rectangular portion higher than the peripheral portion thereof. The higher portion or stepped portion 20 has through holes 21 formed in the corners thereof so as to communicate with the outside of the base 2A. The plate 2B is formed to be slightly smaller than the upper face of the receiving portion 4. The holding member 1 and the other portions of the mounting member 2 have the same construction as those in the first embodiment.

In the forming of the coupling member 3, the connecting portions 9 are collapsed by the moving die 10 and the base 2A of the mounting member 2 is inserted deep into the receiving portion 4 in the same manner as in the first embodiment. In this state, the holding member 1 and the mounting member 2 are set in the die. The molten soft resin is supplied into the die, so that the pipe clamp as shown in FIG. 9 is obtained. The formed coupling member 3 includes an upper face 22 covering the plate 2B with the stepped portion 20 being exposed, the square cylindrical portion 3B (not shown for the reason of the similarity with than in the first embodiment) formed between the receiving portion 4 and the base 2A, and a leg edge 23 formed along the peripheral edge of the receiving portion 4 so as to project lower than the receiving portion 4. In the second embodiment, the molten soft resin is introduced through the holes 5 and the bridge pieces 8 as in the first embodiment. Additionally, the holes 21 are formed so that the molten soft resin is introduced to the upper face of the plate 2B. Consequently, the mechanical coupling strength of the holding member 1 is improved relative to the mounting member 2. For example, when a pushing force acts on the holding member 1 toward the body panel side, the leg edge 23 is pushed to cause the square cylindrical portion 3B and in turn the plate 2B to rise. In such a case, however, the provision of the upper face 22 effectuates the pressure of the plate 2B, thereby preventing separation of the holding member and mounting members 1 and 2.

FIGS. 10 to 18 illustrate a third embodiment of the invention. In the foregoing embodiments, the mounting member 2 is moved with the connecting portions being collapsed to thereby be accommodated in the receiving portion 4 of the holding member 1. In this, the mounting member 2 is pushed by the moving die 10. Since the side of the mounting member 2 opposed to the moving die 10 is flat, the mounting member 2 cannot reliably be held by the moving die 10. As a result, since the mounting member 2 is sometimes prevented from moving straightforward, it could move obliquely relative to the receiving portion 4. This would result in a failure in the forming of the coupling member 3. It could be suggested that guide means comprising a fitting of concavity and convexity be provided for introducing the mounting member 2 straightforwardly into the receiving portion 4. However, since such a structure necessitates contact between both of them, the structure cannot be adopted from the point of view that the transfer of vibration should be prevented.

The third embodiment is directed to a solution of the above-described problem. In the pipe clamp of the third embodiment, the holding member 31 comprises a first holding member 31A and a second holding member 31B each formed of a hard synthetic resin such as polyacetal and connected together by a collapsible connecting edge 52 for separation. The mounting member 33 is connected to the first holding member 31A by the connecting portion 34. However, the third embodiment differs from the foregoing embodiments in that a predetermined positional relation between the mounting member 33 and the first holding member 31A is maintained in the breaking of the connecting portions 34 without the movement of the mounting member.

The mounting member 33 will first be described. The mounting member 33 is formed of the same hard resin as the first and second holding members 31A and 31B into the shape of a square cylinder with upper and lower open ends. The mounting member 33 has a pair of visor edges 35 extending horizontally outward from left-hand and right-hand locations on the upper outer face thereof as viewed in FIG. 10. The mounting member 33 further has an insertion hole 36 open at the central inner bottom thereof or the side opposed to the body panel B. The hole 36 is adapted to receive the stud bolt standing from the body panel B. The open edge of the hole 36 is provided with a pair of engaging claws 37 engageable with the stud bolt. Each claw 37 projects obliquely inward from the open edge of the hole 36 and is allowed to flex. Each engaging claw 37 has an overhang 37A extending circumferentially from both sides of the distal end thereof. Both overhangs 37A are capable of engaging the stud bolt. Four guide pieces 38 are disposed between the engaging claws 37 so as to be circumferentially spaced from the latter. Each guide piece 38 has an outwardly spreading tapered face formed on an inside of a root portion thereof, so that the stud bolt can readily be guided. Each guide piece 38 is so long that the distal end thereof is located below the corresponding overhang 37A. A pair of inner windows 39 are open in a wall surface of the mounting member 33 for the forming of the engaging claws 37.

The mounting member 33 has in its inside a pair of bolt supports 40 over the engaging claws 37 etc. for supporting the distal end side of the stud bolt. Each bolt support 40 includes an arcuate portion and portions connecting between the ends of the arcuate portion and the corners of the mounting member for the purpose of surrounding the distal end side of the stud bolt. Each bolt support 40 has such a length that it can hold the stud bolt by a predetermined axial length thereof.

The holding member 31 will now be described. The holding member 31 comprises the first holding member 31A and the second holding member 31B connected together for separation as described above. The first holding member 31A is provided with a generally square frame-shaped receiving portion 41 adapted to accommodate the mounting member 33. Voids 42 into which the soft resin is caused to penetrate are formed in the corners of the receiving portion 41 so as to vertically extend through the latter.

Figure 11:
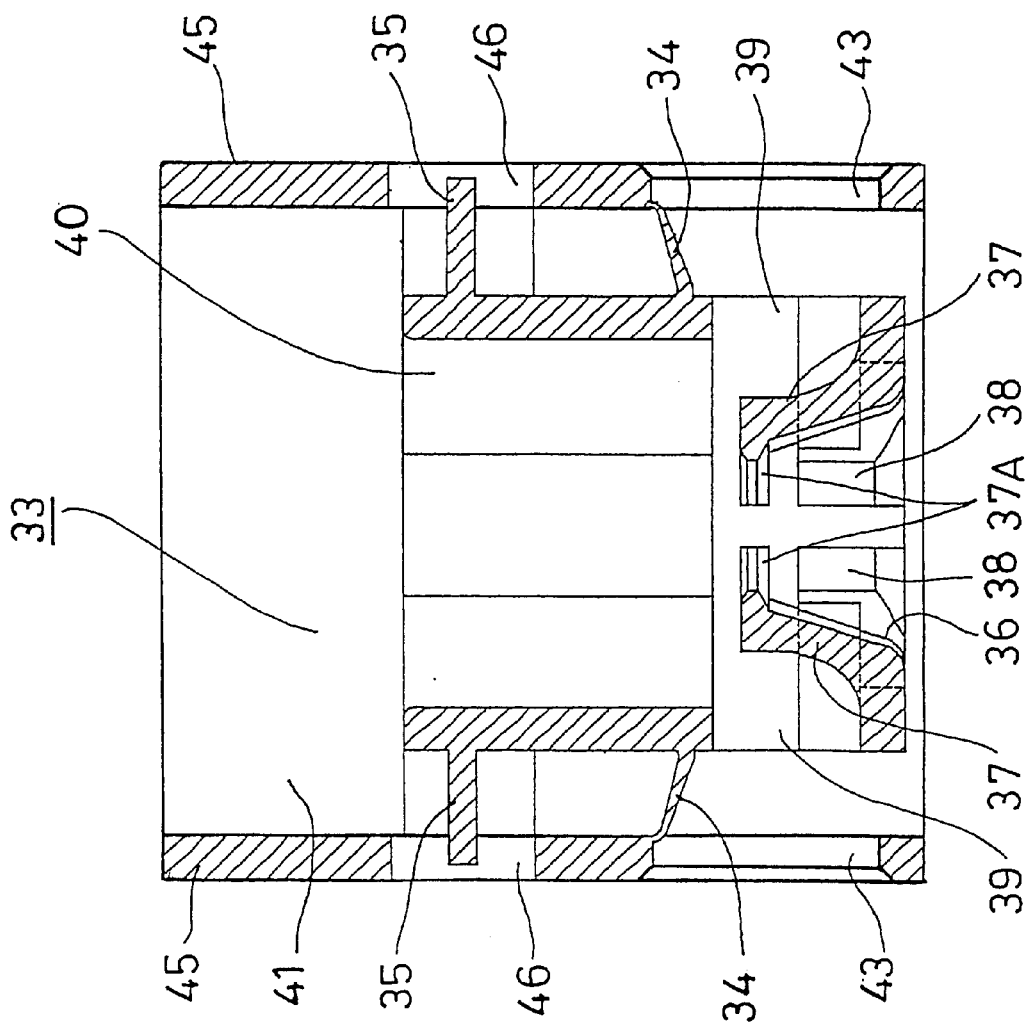
FIG. 11 is a sectional view of the pipe clamp, showing the relationship between the mounting member and the first holding member in the assembly.
Figure 12:
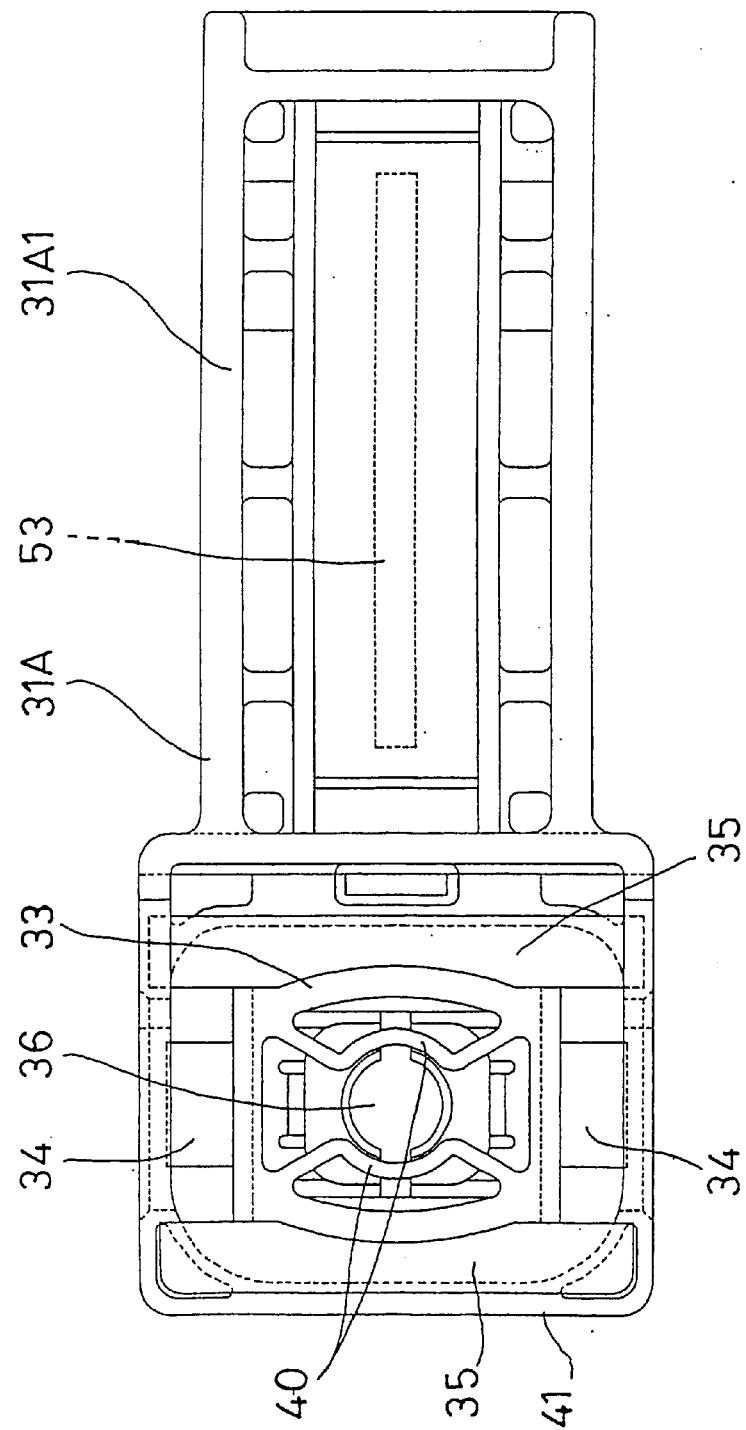
FIG. 12 is a plan view of the pipe clamp before the forming of the coupling member.
Figure 13:
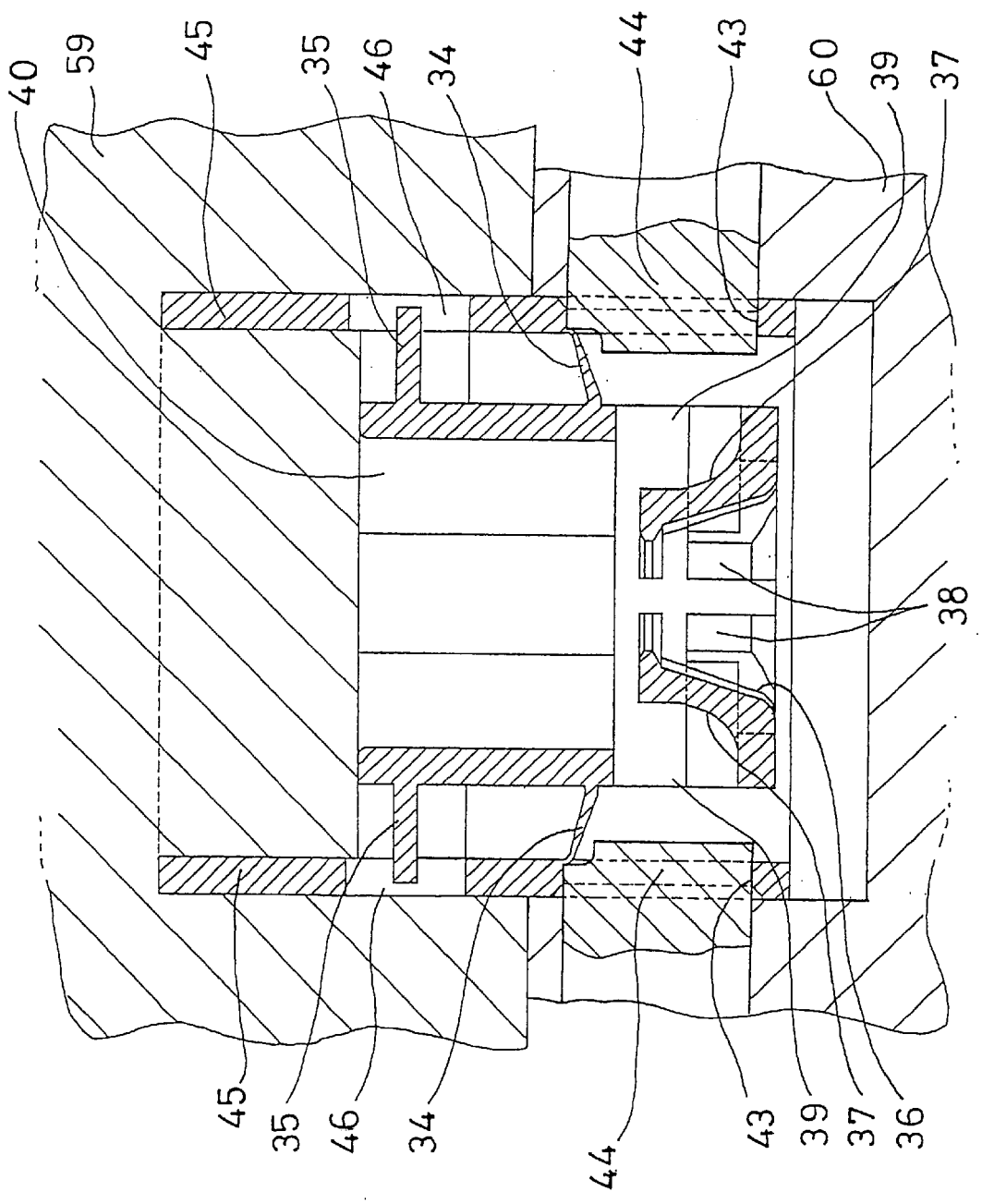
FIG. 13 is a sectional view showing the assembly of the mounting member and the first holding member during the forming.
Figure 14:
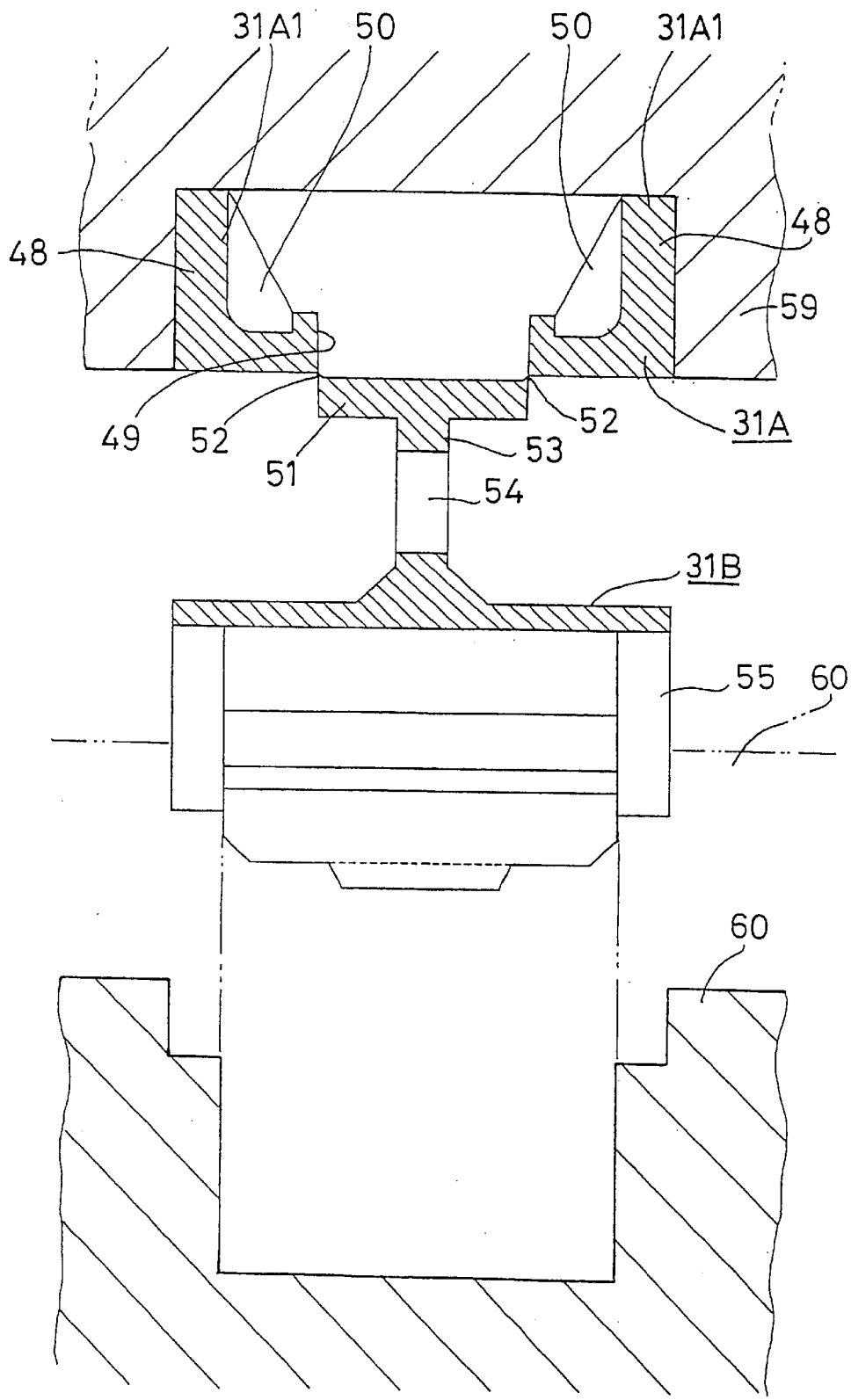
FIG. 14 is a sectional view showing the connection between the first and second holding members during the forming.

The receiving portion 41 has outer windows 43 formed therein to correspond to the inner windows 39 respectively and to be open substantially in alignment with each other. The collapsible connecting portions 34 connect between the upper edges of the outer windows 43 and portions of the mounting member 33 slightly over the upper edges of the inner windows 39 respectively. Each connecting portion 34 is formed to be inclined inward and is accordingly collapsed at an outer connecting end or the end connected to the receiving portion 41 with entrance of slide dies 44 through the respective outer windows 43, as shown in FIGS. 11 and 13.

The receiving portion 41 is connected via a pair of coupling walls 45 to the base 31A1 of the first holding member 31A. The coupling walls 45 have stamped windows 46 respectively. As shown in FIG. 11, both end sides of the rearwardly located visor edges 35 are inserted into the respective windows 46 so as not to extend therethrough to the outside. Consequently, the mounting member 33 is prevented from falling out of the receiving portion 41 even when the coupling members 47 in the windows 46 are periodically deteriorated to be rendered slenderer. Furthermore, the base 31A1 has a pair of standing walls 48. An insertion groove 49 is defined between the standing walls 48 so as to extend a predetermined length. Reinforcing ribs 50 are provided on the inner surface of each standing wall 48 at predetermined intervals. A vertical wall 50A extends downward from one end of the base 31A1 so as to be able to cover an end of the second holding member 31B.

Figure 15:
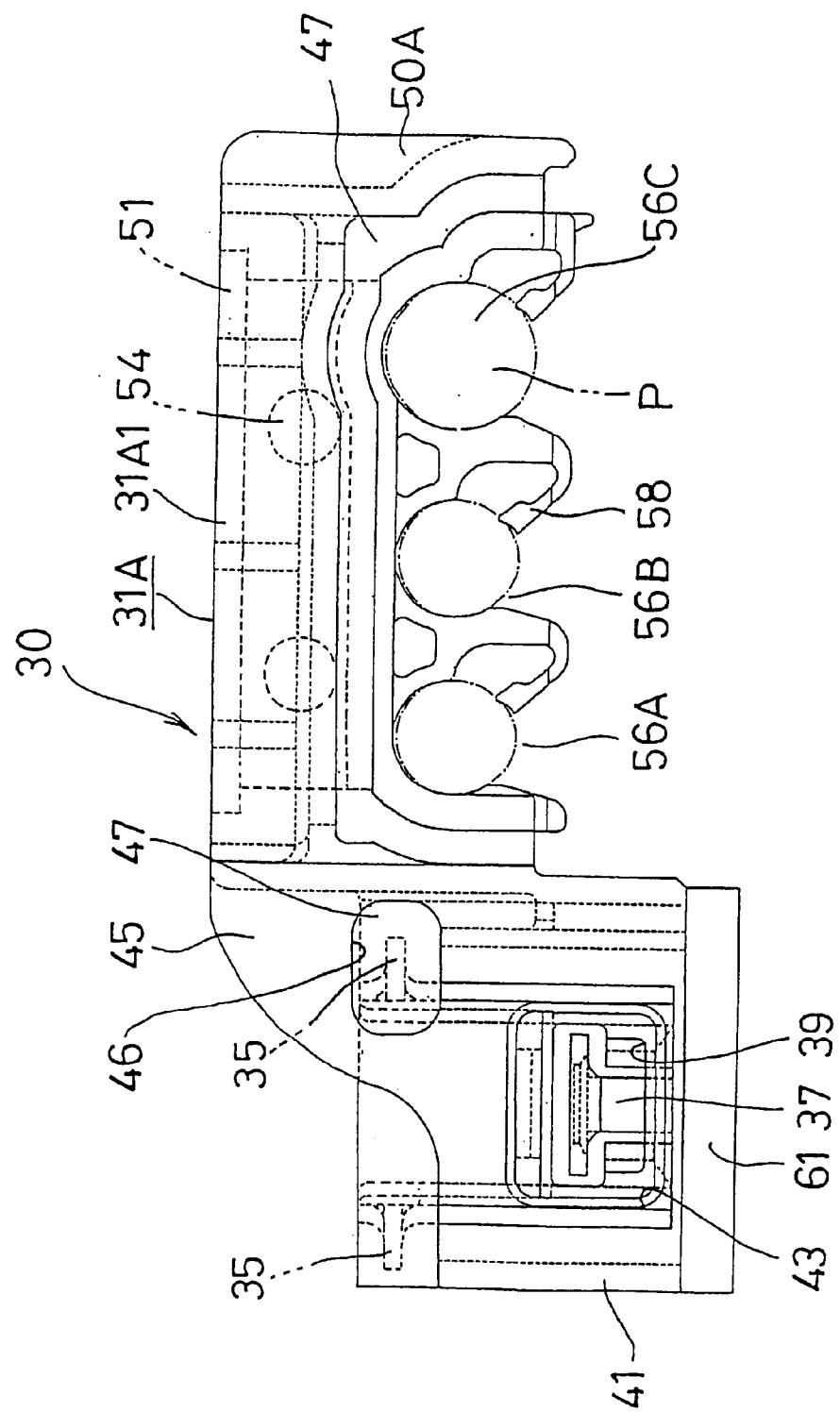
FIG. 15 is a front view of the pipe clamp after completion of the forming.
Figure 16:
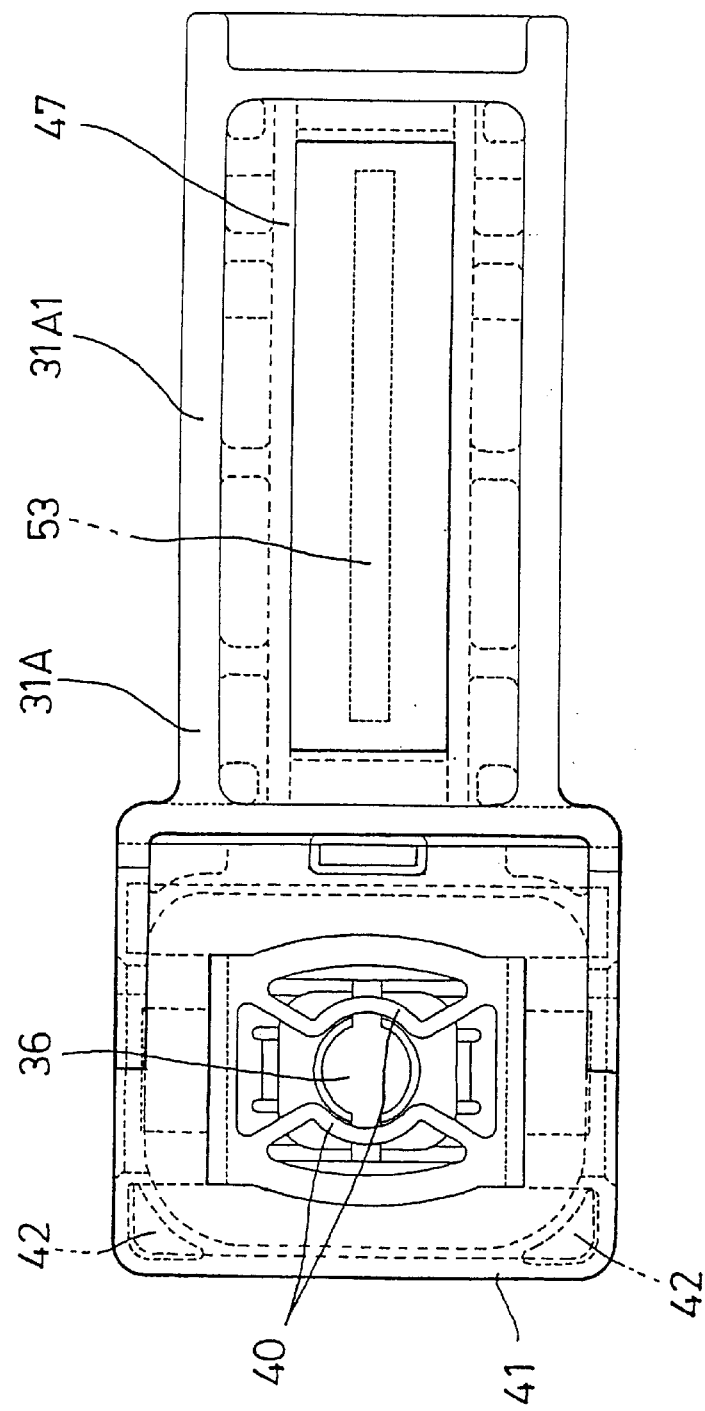
FIG. 16 is a plan view of the pipe clamp after completion of the forming.
Figure 17:
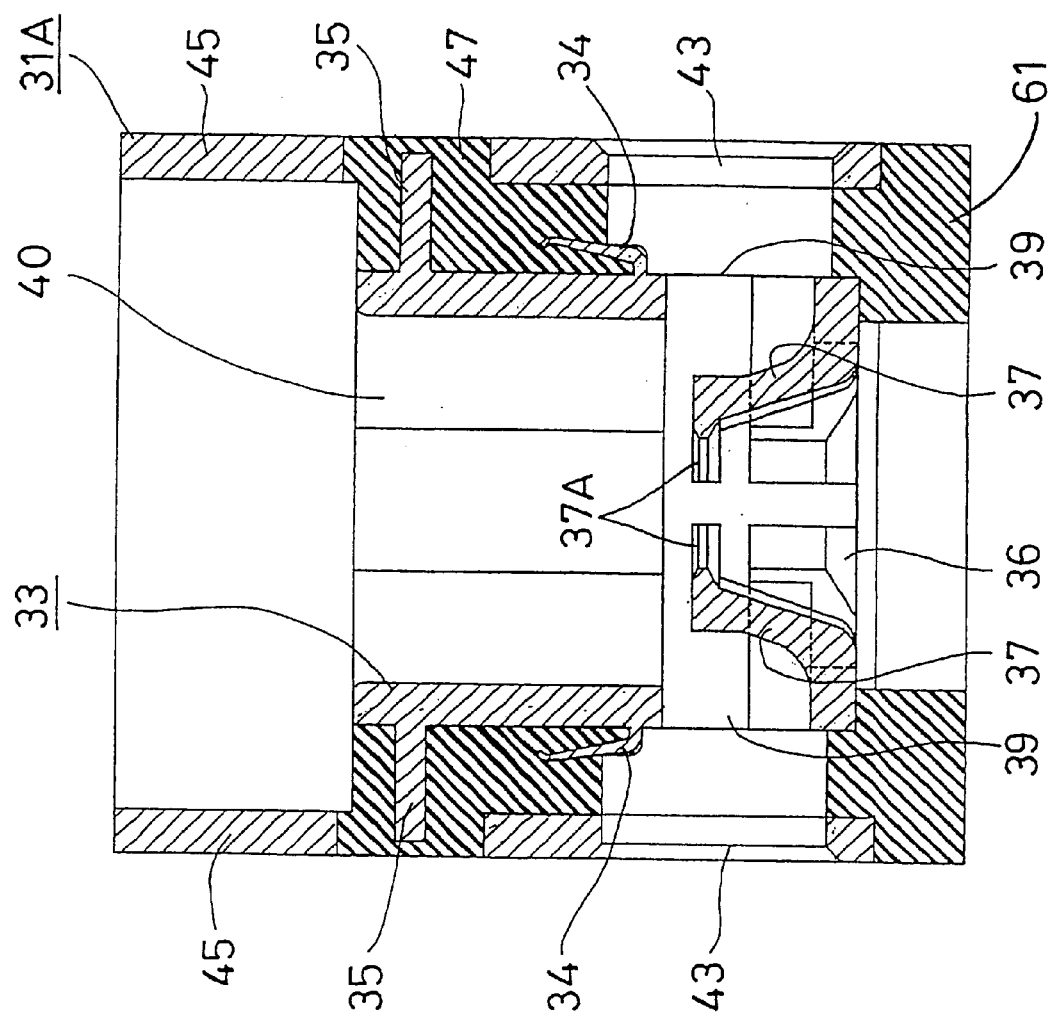
FIG. 17 is a sectional view showing the assembly of the mounting member and the first holding member after completion of the forming.
Figure 18:
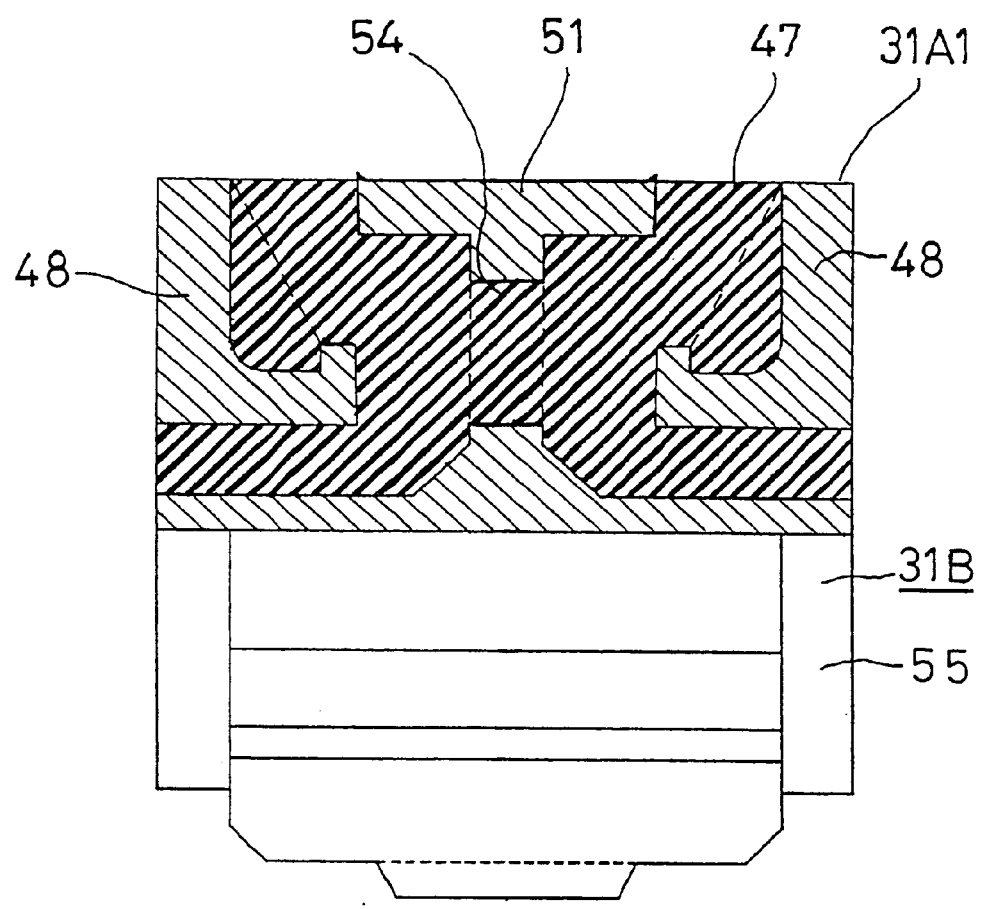
FIG. 18 is a sectional view showing the connection between the first and second holding members after completion of the forming.

A ceiling plate 51 of the second holding member 31B is provided along the bottom of the insertion groove 49 so as to extend lengthwise with respect to the latter. The ceiling plate 51 and the opening edge of the insertion groove 49 are connected to a collapsible connecting edge 52 (connecting portion). A side plate 53 extends downward from the central backside of the ceiling plate 51 lengthwise with respect to the latter. The side plate 53 is formed with two circular holes 54 extending therethrough. A pipe holder 55 having three pipe holding grooves 56A to 56C is provided on the lower edge of the side plate 53. The lower edge of the pipe holder 55 is at the same level as the lower edge of the receiving portion 41 before the forming of the coupling member 47. The pipe holder 55 displaces to a location as shown in FIG. 15 when the first and second holding members 31A and 31B are disconnected or the connecting edge 52 is collapsed in the forming of the coupling member 47. Each of the pipe holding grooves 56A to 56C is formed generally into a U-shape opening facing the body panel side and has in its deep inside an accommodating section 57 conforming to an outer circumference of the corresponding pipe. Each groove has a fall-off preventing claw 58 allowed to flex in a spreading direction. Each claw 58 returns to its former shape after the pipe P has been introduced therein, abutting and engaging the outer circumference of the pipe P to thereby prevent the pipe from falling off.

Figure 10:
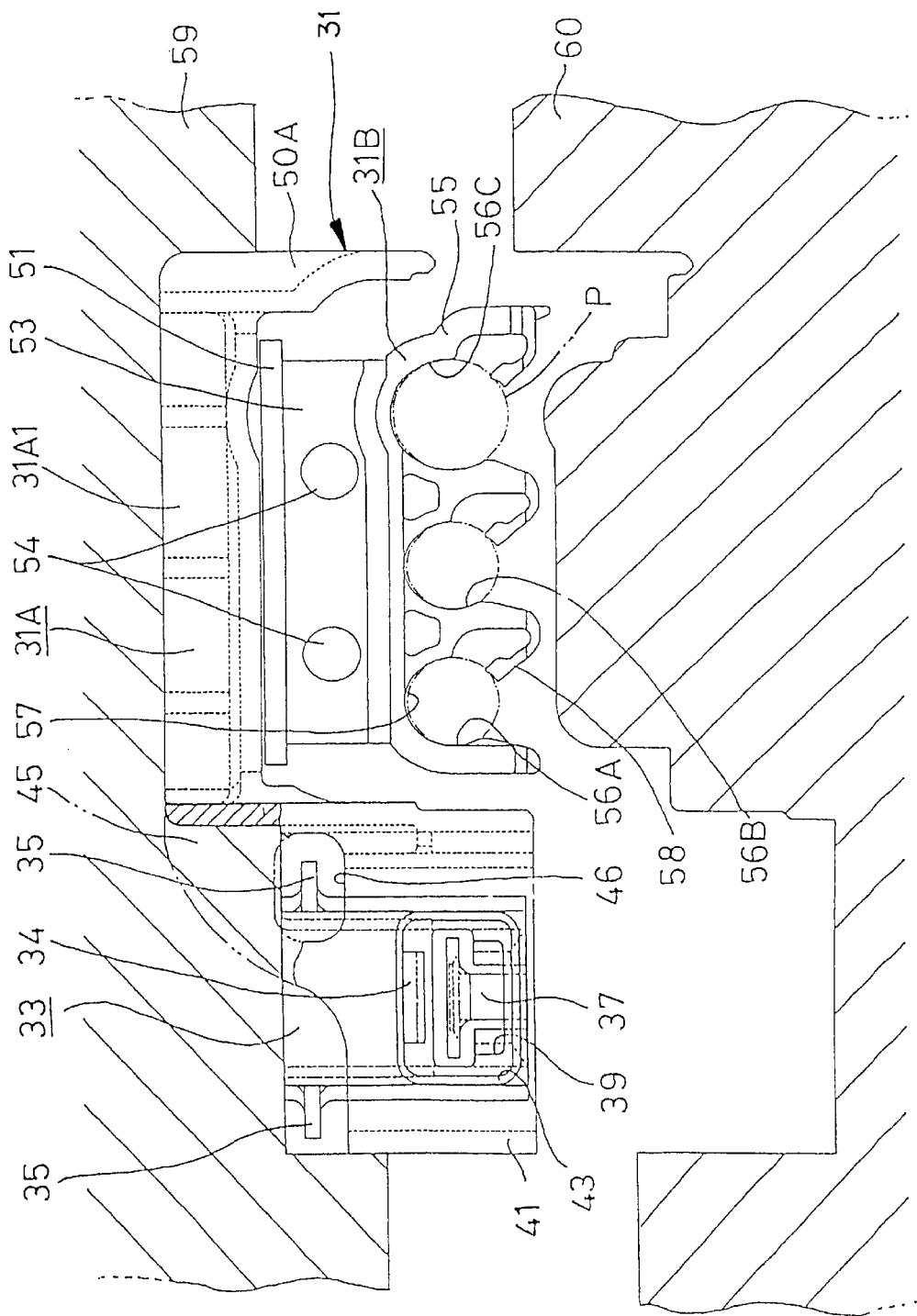
FIG. 10 is a partially broken front sectional view of the pipe clamp of a third embodiment during the forming thereof.

The forming of the coupling member 47 will now be described. The overall pipe holder 55 is positioned and set in the fixed die 59 as shown in FIG. 10. The slide dies 44 are moved forward after the die closing to thereby enter the inner windows 39 through the outer windows 43 respectively. With the entrance of the slide dies 44, the connecting portions 34 are collapsed at their outer end sides and lifted up (see FIG. 17). Thus, the mounting member 33 and the holding member (the first holding member 31A) are separated from each other and do not contact each other. However, the third embodiment differs from the first and second embodiments in that the separation between the mounting member 33 and the holding member 31 accompanies no movement of the mounting member 33 relative to the holding member 31 and accordingly, an initial positional relation between them is maintained.

A moving die 60 pushes the second holding member 31B when closing the fixed die 59. As a result, the breaking of the connecting edges 52 breaks the connection between the ceiling plate 51 of the second holding member 31B and the opening edge of the insertion groove 49 of the first holding member 31A. Thus, the first and second holding members 31A and 31B are separated from each other, so that the upper side of the second holding member 31B enters the inside of the base 31A1. More specifically, since the ceiling plate 51 enters to abut the fixed die 59, both holes 54 are hidden inside the base 31A1 as shown in FIG. 15. Consequently, both holding members 31A and 31B are completely separated from each other.

The second holding member 31B, when moved, is held between the opposite sides of the moving die 60 substantially over its entire length. Thus, since the second holding member 31B is held in a stable state, it can be moved straightforwardly after separated from the ceiling plate 51. Consequently, the assembling can be carried out with ease.

The die is closed as described above and only a space used for forming the coupling member 47 is defined between the mounting member 33 and the first holding member 31A, and between the first and second holding members 31A and 31B. The molten soft resin (an elastomer of the styrene-butylene system, for example) is supplied into the die and the forming is completed. The desired pipe clamp 30 is obtained after opening the die.

The formed coupling member 47 is disposed along the entire circumference of the bottom of the mounting member 33, so that the coupling member 47 serves as a cushion 61 when the pipe clamp 30 is mounted on the body panel. On the other hand, the coupling member 47 extends from the upper face of the receiving portion 41 to the upper face of the mounting member 33. This part of the coupling member 47 is connected to the cushion 61 by the soft resin having entered the voids 42, whereby the mounting member 33 is prevented from falling off from the receiving portion 41. Additionally, the material for the coupling member 47 around the upper face of the receiving portion 41 covers the visor edges 35 and further enters the windows 46 to be planar therewith. Consequently, the falling off of the coupling member 47 can reliably be prevented.

The material for the coupling member 47 further enters the space between the first and second holding members 31A and 31B, thereby covering the outer faces (upper side in FIG. 15) of the pipe holding grooves 56A to 56C as shown in FIG. 15. The material for the coupling member 47 further enters the inside of the base 31A1 of the first holding member 31A. In this case, the material flows through holes 54 to serve as catching portions, thereby preventing falling off of the first and second holding members 31A and 31B.

The pipes P are held by the above-described pipe clamp 30 as follows. First, the groove 56A to 56C corresponding to the pipe P to be fixed is selected. The pipe P is pushed into the selected groove 6. The pipe P is introduced into the groove 6, pushing the fall-off preventing claws 58 in the spreading direction. Each claw 58 elastically returns to its former shape when the pipe P is accommodated in the accommodating section 57 so as to be fitted with its inner wall surface. Since the distal end of each claw 58 abuts against the outer circumferential surface of the pipe P, the pipe is prevented from fall-off.

The distal end of the stud bolt is aligned with the insertion hole 14 and thrust thereinto after the pipes have been held by the pipe clamp. The stud bolt is inserted into the hole, spreading the engaging claws 37. When the stud bolt is inserted to its root portion, the overhangs of the engaging claws 37 engage the stud bolt to thereby prevent fall-off of the latter.

The first holding member 31A and the mounting member 33 are completely separated from each other as the result of the breaking of the connecting portions 34. Furthermore, the coupling member 47 with the ability to absorb vibration is interposed between the first holding member 31A and the mounting member 33. Additionally, the first and second holding members 31A and 31B are completely separated from each other, and the coupling member 47 is also interposed therebetween. Consequently, the vibration caused in the pipes P can reliably be prevented from transferring to the body panel.

Furthermore, since the mounting member, and the first and second holding members are integrated in the forming of the coupling member, the setting of these members in the die can be carried out by an automatic machine. Consequently, the manufacturing efficiency can be improved.

The connecting portions 9 are collapsed by making use of the closing of the die in the foregoing embodiments. However, the connecting portions may be collapsed by injection pressure in the forming of the coupling member 3, instead. Any method of collapse or disconnection may be used so long as the holding member and the mounting member are integrated in the setting in the die.

The stud bolt is used for fixing the pipe clamp to the body panel in the foregoing embodiments. A bolt and nut may be used, instead. The threaded shank may or may not be used as the engaging structure.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A pipe clamp including a holding member formed of a hard resin to hold a pipe, a mounting member formed of a hard resin to mount the pipe on a surface, and a coupling member formed of a vibration-absorbing soft resin located within a space defined between said holding member and said mounting member, wherein said coupling member couples said holding member to said mounting member, said pipe clamp made by a method comprising:

setting the holding member and the mounting member in a die, wherein the holding member and the mounting member are connected together by a breakable connecting portion;

closing the die so that the die pushes the holding member relative to the mounting member, thereby breaking the connecting portion; and injecting a molten resin into a space between the holding member and the mounting member, whereby solidification of the molten resin forms the coupling member and couples the holding member to the mounting member.

2. The pipe clamp according to claim 1, wherein the holding member includes a first portion having a pipe holding groove, a second portion, and a coupling element formed in a space between the first portion and the second portion, wherein the coupling element couples the first portion to the second portion and is of the same soft resin as that of the coupling member.

3. The pipe clamp according to claim 1, wherein one of the holding member and the mounting member includes a void through which the molten resin flows during the injection of the molten resin.

4. The pipe clamp according to claim 1, wherein the holding member includes a receiving portion and the mounting member is receivable within the receiving portion, and wherein the closing of the die inserts the mounting member into the receiving portion.

5. The pipe clamp according to claim 1, wherein the holding member includes a receiving portion, and the mounting member is located at a predetermined position within the receiving portion while being connected to the holding member via the breakable connecting portion, and wherein the closing of the die maintains the mounting member at the predetermined position within the receiving portion.

6. The pipe clamp according to claim 1, wherein the holding member and the mounting member are formed of the same hard resin.

7. The pipe clamp according to claim 6, wherein the holding member includes a first portion having a pipe holding groove, a second portion, and a coupling element formed in a space between the first portion and the second portion, wherein the coupling element couples the first portion to the second portion and is of the same soft resin as that of the coupling member.

8. The pipe clamp according to claim 6, wherein one of the holding member and the mounting member includes a void through which the molten resin flows during the injection of the molten resin.

9. The pipe clamp according to claim 6, wherein the holding member includes a receiving portion and the mounting member is receivable within the receiving portion, and wherein the closing of the die inserts the mounting member into the receiving portion.

10. The pipe clamp according to claim 6, wherein the holding member includes a receiving portion, and the mounting member is located at a predetermined position within the receiving portion while being connected to the holding member via the breakable connecting portion, and wherein the closing of the die maintains the mounting member at the predetermined position within the receiving portion.

11. The pipe clamp according to claim 1, wherein the injecting step includes injecting the molten resin into the space between the holding member and the mounting member while the holding member and the mounting member remain in the die.

12. The pipe clamp according to claim 11, wherein the holding member includes a first portion having a pipe holding groove, a second portion, and a coupling element formed in a space between the first portion and the second portion, wherein the coupling element couples the first portion to the second portion and is of the same soft resin as that of the coupling member.

13. The pipe clamp according to claim 11, wherein one of the holding member and the mounting member includes a void through which the molten resin flows during the injection of the molten resin.

14. The pipe clamp according to claim 11, wherein the holding member includes a receiving portion and the mounting member is receivable within the receiving portion, and wherein the closing of the die inserts the mounting member into the receiving portion.

15. The pipe clamp according to claim 11, wherein the holding member includes a receiving portion, and the mounting member is located at a predetermined position within the receiving portion while being connected to the holding member via the breakable connecting portion, and wherein the closing of the die maintains the mounting member at the predetermined position within the receiving portion.

16. The pipe clamp according to claim 11, wherein the holding member and the mounting member are formed of the same hard resin.

17. The pipe clamp according to claim 16, wherein the holding member includes a first portion having a pipe holding groove, a second portion, and a coupling element formed in a space between the first portion and the second portion, wherein the coupling element couples the first portion to the second portion and is of the same soft resin as that of the coupling member.

18. The pipe clamp according to claim 16, wherein one of the holding member and the mounting member includes a void through which the molten resin flows during the injection of the molten resin.

19. The pipe clamp according to claim 16, wherein the holding member includes a receiving portion and the mounting member is receivable within the receiving portion, and wherein the closing of the die inserts the mounting member into the receiving portion.

20. The pipe clamp according to claim 16, wherein the holding member includes a receiving portion, and the mounting member is located at a predetermined position within the receiving portion while being connected to the holding member via the breakable connecting portion, and wherein the closing of the die maintains the mounting member at the predetermined position within the receiving portion.

* * * * *